April 12, 1932.　　　　H. T. HERR　　　　1,853,613
INTERNAL COMBUSTION ENGINE CONTROL MECHANISM
Filed Dec. 30, 1927　　　3 Sheets-Sheet 1

WITNESS
E. Lutz

INVENTOR
H.T.Herr
BY
a. B. Rivers
ATTORNEY

April 12, 1932. H. T. HERR 1,853,613

INTERNAL COMBUSTION ENGINE CONTROL MECHANISM

Filed Dec. 30, 1927 3 Sheets-Sheet 2

WITNESS
E. Lutz

INVENTOR
H.T. Herr
BY
A. B. Rians
ATTORNEY

April 12, 1932. H. T. HERR 1,853,613
INTERNAL COMBUSTION ENGINE CONTROL MECHANISM
Filed Dec. 30, 1927 3 Sheets-Sheet 3

INVENTOR
H. T. Herr.
BY A. B. Reavis
ATTORNEY

Patented Apr. 12, 1932

1,853,613

UNITED STATES PATENT OFFICE

HERBERT T. HERR, OF MERION, PENNSYLVANIA, ASSIGNOR TO WESTINGHOUSE ELECTRIC & MANUFACTURING COMPANY, A CORPORATION OF PENNSYLVANIA

INTERNAL COMBUSTION ENGINE CONTROL MECHANISM

Application filed December 30, 1927. Serial No. 243,724.

My invention relates to governing mechanism of the type employing a speed-changing device and it has for an object to provide improved means for changing the setting of the speed-changing device.

I am aware of a type of governing mechanism which has been developed for application to an internal combustion engine, this governing mechaism being characterized by the employmet of a lever, the centrifugal effort of fly-balls or weights being exerted upon one side of the lever and such effort being opposed by spring force applied to the other side of the lever. With this type of governor, the speed-changing or spring device is shiftable along the lever for the purpose of securing a suitable speed range and, at the same time, to provide for such variation in effective spring scale as to secure good regulation throughout the range of speeds. A governor of this type is capable of operating over a fairly wide range of speeds. For example, it may be applied to a Diesel engine for giving a governing speed range to the latter of from about 200 R. P. M. to about 1000 R. P. M. Such a governor is characterized by a speed changer which is shiftable along the governor lever, this shifting being effected by any suitable operating mechanism; and, as developed, this operating mechanism takes the form of a servo-motor whose valve element is manually actuated. In accordance with my invention, I have modified the existing governor arrangement and added elements thereto, such that the operating mechanism for shifting the speed changer may be controlled from a distance, thereby making it possible to control the speeds of a plurality of engines from a single and remote point. This is particularly desirable where the engines are mounted on railway cars and connected, respectively, by electric propulsion means to the traction wheels of the respective cars. More particularly, I provide means for applying a variable and controllable force to the control valve of a motor device, which serves to shift the speed changer, and I arrange for the development of a counterbalancing force due to resulting movement of the motor device. For example, a pressure-responsive device may be associated with the control valve of the motor device, the pressure fluid for the pressure-responsive device being a regulable and controllable air pressure, and a spring may be interposed between the valve and the actuated element of the motor device so as to oppose the pressure-responsive device and to apply to the valve, as a result of movement of the motor device, a force which counterbalances the force of the pressure-responsive device. Accordingly, therefore, it is a more particular object of my invention to provide a governor equipped with a speed changer and having means for controlling the setting of the speed changer, such means including a motor device provided with a control valve, the latter being actuated by a variable and controllable air pressure and a spring being employed to oppose such movement and to apply to the valve a force determined by movement of the motor device, for counterbalancing the force due to the pressure-responsive device.

A further object of my invention is to provide remote control speed-changing apparatus for governors of the character indicated wherein each control device is provided with a manually controllable element such that the setting of each speed changer may be controlled manually and independently of the remote control means.

These and other objects are effected by my invention as will be apparent from the following description and claims taken in connection with the accompanying drawings, forming a part of this application, in which:

Figures 1, 8:
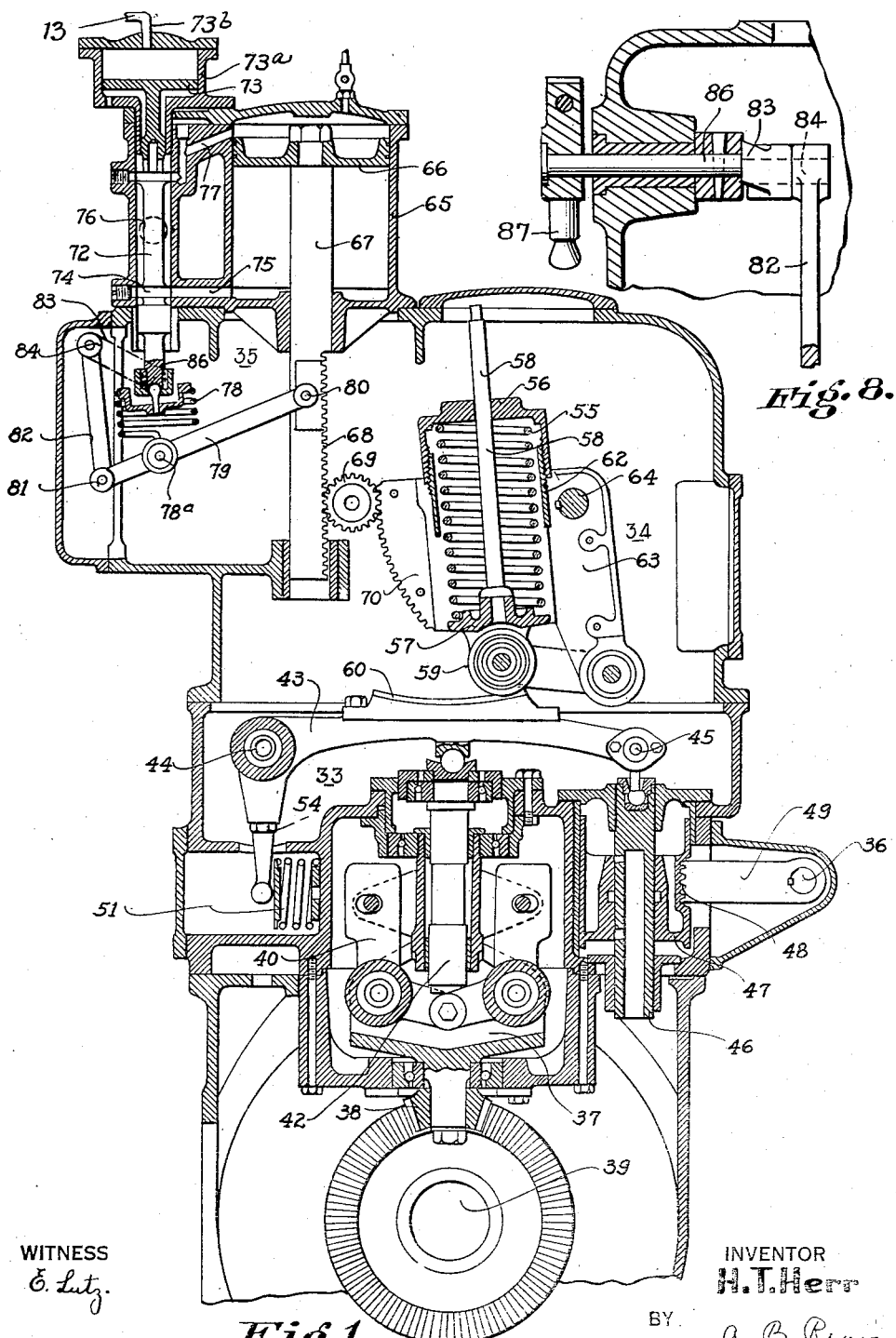
Fig. 1 is a sectional view of governing mechanism having my improved control means applied thereto.
Figure 3:
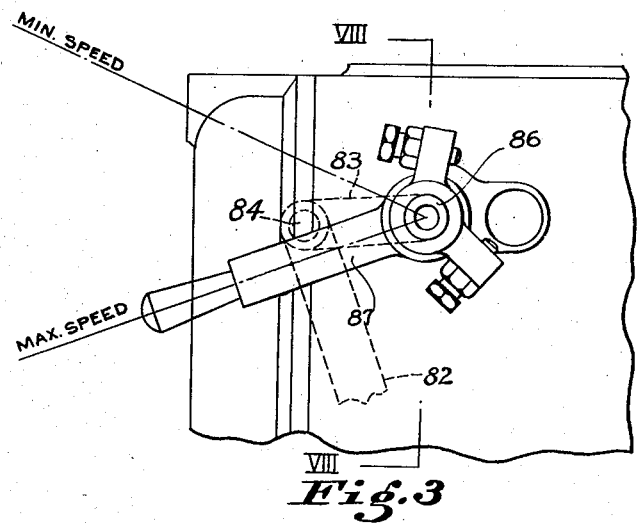
Fig. 3 is a detail view showing a manually-operated crank for adjusting the speed changer.
Figure 7:
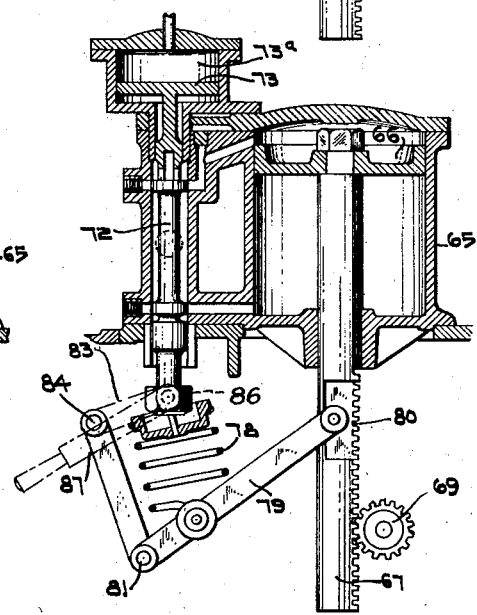

Fig. 7 is still another diagrammatic view of the motor device when the speed changer is set at maximum position and the motor device is being actuated by mechanical means; and, Fig. 8 is a fragmentary, sectional view, taken on the line VIII—VIII of Fig. 3 and showing the relation of the operating handle with respect to the control linkage, all other portions of the apparatus having been omitted for the sake of clarity.

In accordance with my invention, I provide a centrifugal governor having a speed changer whose position is varied by a servomotor device, the latter being controlled by any suitable elastic fluid whose pressure may be varied.

In Fig. 1, I show a governor of the centrifugal type, at 33, and a speed changer, at 34, the speed changer having its setting varied by operating mechanism indicated generally, at 35. Governing movements for any given speed are transmitted from the governing mechanism, at 33, to any suitably actuated element or shaft 36 connected to the controlling element of a prime mover.

Referring now to the governing mechanism, at 33, I show a rotary carrier 37 connected by gearing 38 to a prime mover shaft 39. The carrier has pivotally connected thereto centrifugal weights 40 which act upon the lower end of the spindle 42, the upper end of the spindle being arranged to transmit the centrifugal effort to the lower side of the lever 43 fulcrumed at 44 and having its other end pivotally connected, at 45, to the pilot valve 46 for the operating piston 47, the latter being connected, in any suitable manner, to an actuated shaft 36. In the drawings, I show rack teeth 48 on the operating piston 47 and which mesh with similarly formed teeth on the sector 49 carried by the actuated shaft 36.

Centrifugal force applied to the lever 43 is opposed by spring means associated with the speed changer. Hunting effects may be dampened by a dashpot or spring associated with the lever 43. In the drawings, I show a spring device 51 for this purpose.

The speed changer mechanism, at 34, includes a spring 55 arranged between a follower 56 and a collar 57 on the stem 58, the stem being provided with a roller 59, which is movable along the curved track 60 on the lever 43. The follower 56 is adjustable to secure a suitable degree of compression of the spring 55. When the roller 59 is moved to the extreme left-hand end of the track 60, minimum centrifugal force is opposed by minimum spring force, and the governor is therefore set for minimum speed. On the other hand, with the roller 59 in the position shown in full lines, maximum spring force is effective to oppose centrifugal force and, therefore, the governor has a maximum speed setting.

The spring 55 is carried by a sleeve element 62 provided on the oscillatory member 63 of the speed changer, the oscillatory member being keyed to a supporting shaft 64. The follower 56 has threaded engagement with the sleeve 62, whereby the tension of the spring 55 may be suitably varied. The spring 55 has such relative position with respect to the shaft 64 and the track 60 is so curved that both the effective spring force and the effective spring scale are varied so as to secure good regulation throughout the operating speed range of the governor.

Referring now to the means, at 35, for changing the setting of the speed changer, at 34, this preferably takes the form of a motor device having a cylinder 65 with an operating piston 66 therein. The piston 66 is connected to a piston rod 67, the lower portion of which is provided with rack teeth 68 meshing with an idler pinion 69, which meshes with a sector rack 70 on the oscillatory carrier 63. Hence, it will be seen that the carrier 63 may be oscillated about the axis of the shaft 64 by upward and downward movement of the operating piston 66 of the motor device 64. Since the angular position of the shaft 64 is dependent upon the setting of the speed changer, such shaft may exercise a controlling function, that is, be connected to change the timing.

The motor device is controlled by a pilot valve 72, the latter serving to admit motive fluid to either end of the cylinder 65 and to provide for the exhaust from the other end of such cylinder. The upper end of the pilot valve 72 is connected to a piston 73 arranged in the cylinder 73a, having an elastic fluid supply connection 73b. The pilot valve 72 is, therefore, moved downwardly when the air pressure in the cylinder 73a increases, this resulting in the piston portion 74 of the pilot valve uncovering the cylinder passage 75 and permitting of communication of such passage with the motive fluid supply line 76, and admitting motive fluid beneath the operating piston 66 to move the latter upwardly. Concurrently with the placing of the cylinder passage 75 in communication with the motive fluid supply, the cylinder passage 77 is placed in communication with the exhaust, whereby the operating piston 66 may move upwardly.

Figure 2:
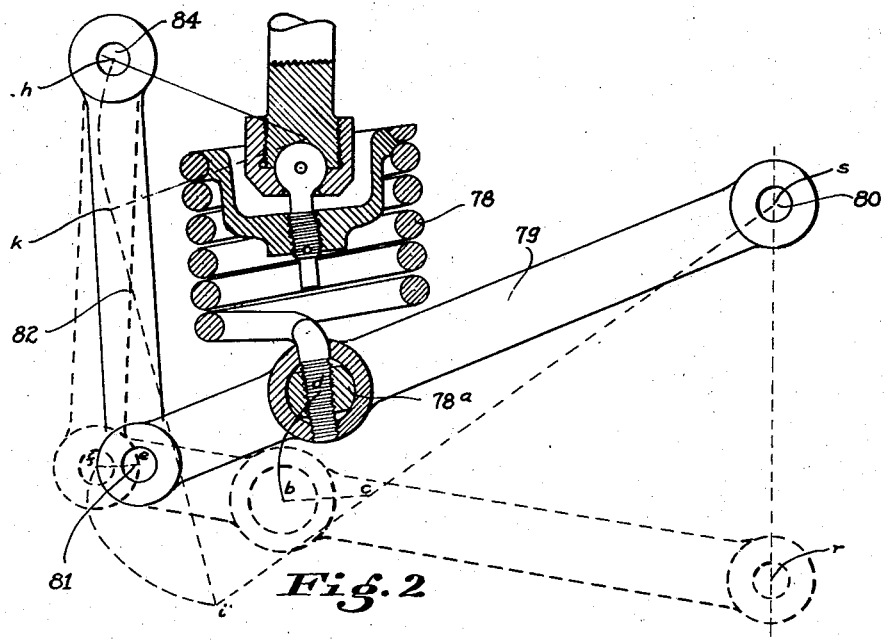
Fig. 2 is a diagrammatic view showing the operation of parts associated with the pilot valve.

Follow-up mechanism is arranged between the piston rod 67 and the pilot valve in order to bring the latter back to neutral cut-off position. As shown in Figs. 1 and 2, the lower end of the pilot valve 72 is pivotally connected to the upper end of a spring 78, the lower end of the spring being pivotally connected, at 78a, to a lever 79, the spring being so arranged and connected to the pilot valve and to the lever as to constitute a flexible power-transmitting link between such elements.

The lever 79 has a pivotal connection 80 at one end with respect to the piston rod 67. The other end of the lever 79 has a pivotal connection 81 with respect to a link 82, the upper end of the latter being supported by an arm 83 having a pivotal connection 84 with respect thereto.

With this arrangement, whenever the pressure of elastic fluid, for example, air, supplied to the cylinder 73a by the line 73b is varied, the pilot valve moves in a direction determined by the change in air pressure. It will be apparent that the lever 79 can not move until it is moved by the operating piston rod 67 for the pivotal connections 80 and 84 are maintained fixed for the time being; however, as soon as the operating piston starts to move, the lever 79 is moved so as to change the force of the spring 78, this movement continuing until the spring force has been changed to such a value as to counterbalance the air pressure force applied to the pilot valve.

If is desired to set the speed changer for minimum speed, the air pressure in the cylinder 73a is reduced, thereby resulting in upward movement of the pilot valve 72 due to the force of the spring 78. Such upward movement of the pilot valve results immediately in downward movement of the operating piston 66 and the latter results in lowering of the lever 79 so as to diminish the force of the spring 78. Movement of this character will continue until the spring force and the force due to the air pressure are in balance and the pilot valve occupies cut-off position.

On the other hand, if the air pressure in the cylinder 73a is increased, the operating piston 66 will be caused to move upwardly, resulting in compression of the spring 78 and upward movement of the operating piston 66 will continue until the force of the spring 78 is in balanced relation with respect to the force of the pressure fluid effective on the pilot valve.

Referring now to the means for controlling the speed changer independently of the fluid pressure control means, it will be seen that the pivotal supporting means 83 is carried by a stub shaft 86 having an outer operating handle 87, as indicated in Fig. 3. When the fluid pressure control means is effective, the lever 86 occupies the uppermost or minimum speed position; however, if it is desired to manually control a speed changer, the air supply may be disconnected or rendered ineffective and the handle 86 actuated from its upper minimum speed position to its lower maximum speed position. When the handle 86 is actuated in this way, it will be apparent that the pivotal connection 84 for the upper end of the link 82 is raised and lowered, thereby causing the lever 79 to fulcrum about the pivotal connection 80. This results in movement of the pilot valve to admit motive fluid to the operating cylinder and the resulting movement of the operating cylinder operates through the lever 79 and the spring 78, the latter serving as a motion-transmitting link, to bring the pilot valve back to neutral, cut-off position.

While the spring 78 is normally not under compression when the arrangement is manually actuated by operating the lever 87, such spring serves a useful purpose in that it provides a yieldable power-transmitting element, thereby making it more readily capable of overcoming friction effects tending to resist movement of the pilot valve.

Upon reference to diagrammatic Fig. 2, the various movements taking place will be more apparent. Position "$r$" indicates the minimum speed position of the pivot connection 80 while "$s$" indicates the full speed position thereof. The position "$h$" is the position of the pivot 84 for fluid pressure or pneumatic operation. As the pivot 84 is fixed when the pilot valve is operating pneumatically, the curved line "$bd$" represents the path of movement of the pivot 78a from minimum to full speed positions. Concurrently with the latter movement, the pivot 81 moves along the line "$fe$".

If the apparatus is manually actuated, the pivot 84 moves from "$h$" to "$k$", the pivot 81 moves from "$f$" to "$i$" and the pivot 78a moves from "$b$" to "$c$" during the time that the pivot 80 moves from minimum speed position "$r$" to full speed position "$s$".

Figure 4:
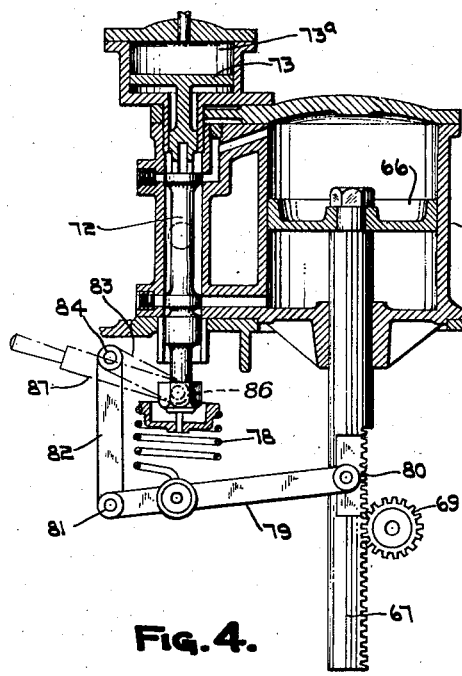
Fig. 4 is a partial diagrammatic view showing the relative positions of the parts of the motor device for adjusting the speed changer of the governor when the latter is being actuated by fluid pressure and the engine is operating at an intermediate speed.
Figure 5:
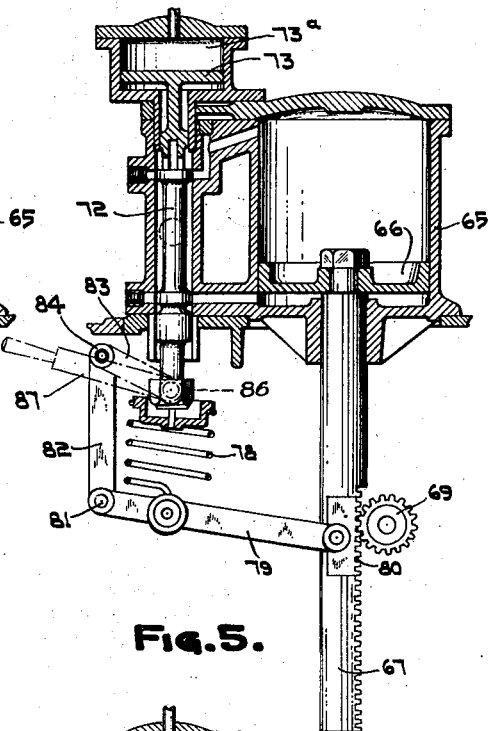
Fig. 5 is a view similar to Fig. 4, and showing the relative positions of parts of the motor device when the speed changer is located at minimum position and when the motor device is being actuated either by fluid pressure or by mechanical means.
Figure 6:
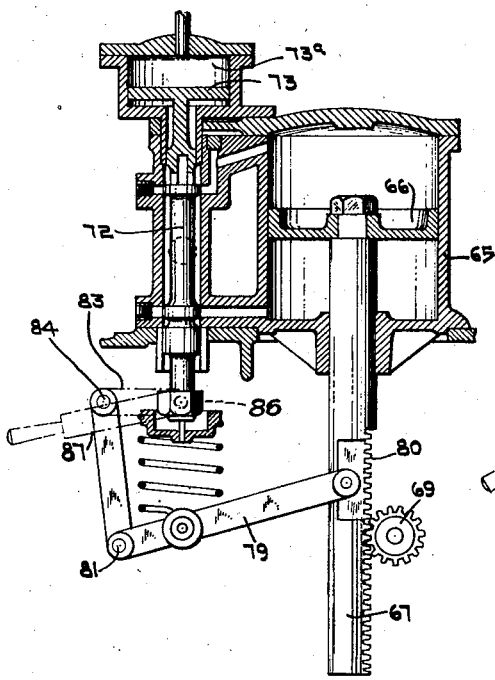
Fig. 6 is another diagrammatic view showing the relative positions of parts of the motor device when the speed changer is set at an intermediate position and the motor device is being actuated by mechanical means.

The foregoing may be more readily comprehended by a comparison of Figs. 1 and 4 to 7. Referring now to Fig. 1, this shows the relative position of the parts of the motor device when the governor speed changer is set for maximum speed and the motor is being operated by fluid pressure. In this position, the spring 78 is under maximum compression. Referring now to Fig. 4, this shows the relative positions of the parts of the motor device when the speed changer is set at an intermediate speed, the motor device still being operated by fluid pressure. From this figure, it will be noted that the operating piston 66 has assumed an intermediate position in the cylinder 65 while the compression of the spring 78 has been somewhat lessened. Referring now to Fig. 5, this shows the relative position of the various parts of the motor device when the speed changer is set at its minimum position. From this figure, it will be noted that the piston 66 is now in its lowermost position within the cylinder 65 while the spring 78 has relatively little or no compressive force acting thereon. Attention is invited to the fact that, the pivot 84, connecting the link 82 and the arm 83, remains stationary as long as the device is being operated by fluid pressure. However, in order to effect mechanical manipulation of the motor device, the pivot 84 is moved.

As stated heretofore, when the motor device is being operated by fluid pressure, the handle 87 remains fixed in minimum speed position. Therefore, as shown in Fig. 5, when the speed changer is set for minimum speed position, the relative positions of the parts of the motor device including the spring 78, the lever 79, the link 82, and the arm 83 are the same whether the motor device is actuated by fluid pressure or by the handle 87. However, as the handle 87 is moved away from minimum speed position, the parts assume the relative positions shown in Fig. 6. It will be noted that manual control, that is, manipulation of the handle 87, has resulted in lowering the pivot 84. During the lowering of the pivot 84, the spring 78 merely serves as a flexible connection between the lever 79 and the pilot valve 72 to cause the latter to be temporarily displaced and to permit motive fluid to enter the upper end of the cylinder 65 until such time as the rod 67 has moved downwardly a sufficient distance to return the pilot valve 72 to its static or cut-off position. Referring now to Fig. 7, this shows the maximum speed position for the motor device when the latter is being actuated by the handle 87.

From the foregoing, it will be apparent that, during operation by fluid pressure, the thrust of the spring 78 serves to counterbalance the pneumatic pressure acting on the piston 73 in the cylinder 73a. As long as fluid-pressure operation takes place, the pivot 84 remains stationary. However, when operation by means of the handle 87 takes place, the pivot 84 is moved and the spring 78 merely serves as a flexible connecting link between the lever 79 and the pilot valve 72.

From the foregoing, it will be apparent that I have devised a governor including a speed changer together with operating mechanism for changing the setting of the speed changer, the operating mechanism including a servo-motor having a pilot valve moved in one direction by a spring and moved in the other direction by pressure of elastic fluid. The arrangement is such that in case of movement of the pilot valve due to change in pressure of the controlling elastic fluid, the actuated element of the servo-motor causes the force of the spring to change so that the latter may be brought into equilibrium with the changed elastic fluid pressure force and the valve restored to cut-off position. In addition, due to the interposition of the spring between the pilot valve and the follow-up lever, this permitting of the operation just referred to, the pivotal connection for the lever may be moved manually in order that the servo-motor may be manually controlled.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In apparatus of the character described, the combination of a motor device having an actuated element, a valve movable in opposed directions to secure cut-off and operation of the motor device in both directions, a spring for moving the valve in one direction, means responsive to controlled elastic fluid pressure and acting in opposition to the spring for moving the valve in the other direction, said valve occupying cut-off position when the opposed spring and fluid pressure forces acting thereon are substantially in equilibrium, follow-up means operated by the actuated element of the motor device for modifying the spring force to bring the latter into substantial equilibrium with the changed elastic fluid pressure force in order to restore the valve to cut-off position, and means for manually operating the valve through the spring in order to effect movement of the actuated element of the motor device throughout the substantial portion of its travel.

2. In apparatus of the character described, the combination of a motor device having an actuated element, a valve movable in opposed directions to secure cut-off and operation of the motor device in both directions, a spring for moving the valve in one direction, means responsive to controlled fluid pressure and acting in opposition to the spring to secure movement of the valve in the other direction, said valve occupying cut-off position when the opposed spring and fluid pressure forces acting thereon are substantially in equilibrium, follow-up means including a lever connected to the actuated element of the motor device and operatively connected to the spring, pivotal supporting means for said lever spaced from the connection thereof with respect to the spring, whereby, when the lever is moved by the actuated element, the spring force is brought into equilibrium with the changed fluid pressure force in order to restore the valve to cut-off position, and means for manually moving the pivotal supporting means for the lever to secure manual control of the motor device.

3. In apparatus of the character described, the combination of a motor device having an actuated element, a valve movable in opposed directions to secure cut-off and operation of the motor device in both direction, a spring for moving the valve in one direction, means responsive to controlled fluid pressure and acting in opposition to the spring to secure operation of the valve in the other direction, said valve occupying cut-off position when the opposed spring and fluid pressure forces acting thereon are substantially in equilibrium, follow-up means including a lever pivotally connected at one end to the actuated element and connected intermediately of its length to said spring, pivotal supporting means for the other end of the lever, the actuated element of the motor device operating the lever about said pivotal supporting means to modify the spring force to bring the latter into equilibrium with the changed fluid pressure force in order to restore the valve to cut-off position, and manual means for moving said pivotal supporting means in order to secure manual control of the motor device.

4. In apparatus of the character described, the combination of a motor device having an actuated element, a movable member embodying a piston portion and a valve portion, said valve portion cooperating with the cylinder of the motor device to control the admission of motive fluid thereto, a cylinder cooperating with the piston portion of the movable member to form a pressure responsive device, said latter cylinder having a port for the admission of elastic fluid, follow-up mechanism including a lever pivotally connected at one portion to the actuated element of the motor device, a spring for connecting another portion of the lever to the movable member, supporting means for the lever, and means for changing the position of said supporting means so as to effect manipulation of the valve, whereby said valve may be actuated independently of said pressure responsive device.

5. In apparatus of the character described, the combination of a motor device having an actuated element, a valve for controlling the motor device, a pressure responsive device including a movable element engaging one end of the valve for actuating the same, a spring engaging the other end of the valve for opposing movement of the movable member of the pressure responsive device, follow-up mechanism including a lever operatively connected to the actuated element of the motor device and to the spring, supporting means for the lever, and means for changing the position of said supporting means so as to effect manual manipulation of the valve, whereby said valve may be actuated independently of said pressure responsive means.

In testimony whereof, I have hereunto subscribed my name this 13th day of December, 1927.

HERBERT T. HERR.